United States Patent Office 3,396,202
Patented Aug. 6, 1968

3,396,202
PROCESS FOR PREPARING 1,1,1,2-TETRACHLORO-2 - FLUOROETHANE AND 1,1,1 - TRICHLORO-2,2-DIFLUOROETHANE
Ferenc M. Pallos, El Cerrito, and Attila E. Pavlath, Berkeley, Calif., assignors to Stauffer Chemical Company, New York, N.Y., a corporation of Delaware
No Drawing. Filed Jan. 16, 1967, Ser. No. 609,318
4 Claims. (Cl. 260—653)

ABSTRACT OF THE DISCLOSURE

A process for preparing chlorofluorethane compounds such as 1,1,1,2-tetrachloro-2-fluoroethane and 1,1,1-trichloro-2,2-difluorethane by reacting $[AsCl_4]^+[AsF_6]^-$ or $[SbCl_4]^+[SbF_6]^-$ with bis (2,2,2-trichloro-1-hydroxyethyl) sulfide and collecting the chlorofluoroethane.

---

The principal chlorofluoroethane compounds of the process of this invention are 1,1,1,2-tetrachloro-2-fluoroethane and 1,1,1-trichloro-2,2-difluoroethane. These chlorofluoroethanes were useful particularly as intermediates for the preparation of the monomers, tetrafluoroethylene and chlorotrifluoroethylene.

Generally, the process of this invention comprises reacting a mixture of bis(2,2,2-trichloro-1-hydroxyethyl) sulfide with the fluorochloroarsenic complex, $$[AsCl_4]^+[AsF_6]^-$$

or the fluorochloroantimony complex, $[SbCl_4]^+[SbF_6]^-$, and the recovering of the chlorofluoroethane compounds prepared by the reaction of these materials.

The mechanism for the reaction in the process of the present invention is not fully understood. However, it is obvious that at least one of the carbon-sulfur bonds is cleaved during the reaction with the addition of either chlorine or fluorine to the carbon atom thereof. It is also apparent that the hydroxyl group of the 2,2,2-trichloro-1-hydroxyethyl moiety is replaced by either a chlorine or fluorine atom during the reaction.

The fluorochloroarsenic complex or the fluorochloroantimony complex serve in a dual capacity in the reaction mixture. They serve as active fluorinating agents, and they also serve as active fluorinating and chlorinating agents. The preparation of fluorochloroarsenic complex is described in the chemical literature by L. Kolditz on pages 313–320 of Zeit. Anng. Allg. Chem., 280, 1955. Generally, the preparation of the complex $[AsCl_4]^+[AsF_6]^-$ involves the chlorination of arsenic trifluoride with the stoichiometric amount of chlorine. For chlorinating the arsenic trifluoride, a small amount of water should be added to the arsenic trifluoride. The water acts as a catalyst in the reaction. If less than a stoichimetric amount of chlorine is used, then a solution of the complex in arsenic trifluoride can be prepared. The reaction may be run conveniently in conventional glass equipment. The physical properties of the fluorochloroarsenic complex are described in the article by L. Kolditz. The antimony fluorochloro complex, $[SbCl_4]^+[SbF_6]^-$, can be prepared in a like manner by chlorinating antimony trifluoride. The fluorochloroarsenic complex or the fluorochloroantimony complex can be prepared separately before addition of the sulfide compound or they may be prepared in situ for reaction with the sulfide compound of this invention.

The bis(2,2,2-trichloro-1-hydroxyethyl)sulfide can be prepared by reaction of hydrogen sulfide with chloral in a concentrated aqueous solution as described in British Patent No. 815,570.

It is preferred to react the sulfide reactant of this invention with the fluorochloroarsenic complex or the fluorochloroantimony complex for the preparation of chlorofluoroethane compounds by heating them at temperatures above 60° C. at atmospheric pressure. A preferred temperature range at atmospheric pressure is about 90° C. to about 260° C. Although the reaction can be run at higher temperatures, there is normally no advantage in doing so. Also, the reaction can be run at subatmospheric or superatmospheric pressures; however, there is no necessity to do so since the reaction can be conveniently run at atmospheric pressures.

Although process of this invention can be carried out by simply heating a mixture of the sulfide reactant and the fluorochloroarsenic or fluorochloroantimony complex without any mixing and collecting the reaction product, it is preferred to agitate the reactants during the reaction. Mechanical mixing has been found useful for the agitation. The mixing of the reactants can be best be carried out by forming a slurry of them in an inert liquid such as arsenic trifluoride, for example.

The proportion of the fluorochloroarsenic complex or the fluorochloroantimony complex and the sulfide reactant is not critical; however, it is preferred to react at least 4 moles of the complex with 1 mole of the sulfide reactant. When the complex is prepared in situ, the preferred ratio of arsenic trifluoride or antimony trifluoride to chlorine to the sulfide reactant is at least 8:8:1.

The chlorofluoroethane compounds produced by the process of this invention can be recovered by any conventional technique useful for collecting a gaseous product of a solid or liquid phase reaction mixture and then separating the products, if a mixture of products is obtained.

A convenient method for recovering the gaseous chlorofluoroethane compounds of the process of this invention is to fractionally condense the gaseous products to remove any high-boiling gaseous material from the product, leaving low-boiling products. These low-boiling products can then be collected by low temperature condensing techniques. Any high-boiling materials can be condensed with tap water in appropriate apparatus, and the low-boiling products such as 1,1-difluoroethane or 1,1-difluoropropane can be condensed with a Dry-Ice acetone mixture in appropriate apparatus. The low-boiling products can be cleaned of any acidic vapors by passing vapors of them through a basic solution such as dilute potassium hydroxide.

In the following examples, several preferred embodiments are described to illustrate the invention. However, it should be understood that the invention is not intended to be limited to the specific examples.

EXAMPLE I

The complex $[AsCl_4]^+[AsF_6]^-$ was prepared by placing 125 ml. of arsenic trifluoride and one iodine crystal into a three-neck 300 ml. reaction flask equipped with a stirrer and a piece of glass tubing that extended through a neck fitting to below the surface of the arsenic trifluoride. After the flask, chlorine was passed through the glass tubing and bubbled through the arsenic trifluoride with stirring at room temperature. The chlorine addition was continued until a thick slurry of $[AsCl_4]^+[AsF_6]^-$ in the unreacted arsenic trifluoride was obtained. The iodine crystal catalyzed the reaction between the arsenic trifluoride and the chlorine.

After preparation of the $[AsCl_4]^+[AsF_6]^-$, the slurry was cooled to room temperature and a water-jacketed condenser was connected to the reaction flask equipped with a distillation flesk. Next, 30 grams of bis(2,2,2-trichloro-1-hydroxyethyl)sulfide was added to the slurry with stirring and the reaction flask was heated slowly with an oil bath up to 260° C. bath temperature. The gaseous reaction products were collected in a condensation flask during the heating. The collected material was purified by washing several times with water. The resulting purified material was found by analysis to be composed of about 80 percent by weight 1,1,1,2-tetrachloro-2-fluoroethane and 10 percent by weight 1,1,1-trichloro-2,2-difluoroethane; the remaining portions of the purified distillate were higher boiling compounds. The yields of 1,1,1,2-tetrachloro-2-fluoroethane and the 1,1,1-trichloro-2,2-difluoroethane were found to be 55 and 8 percent, respectively.

EXAMPLE II

The process of Example I was repeated except that the complex $[AsCl_4]^+[AsF_6]^-$ was replaced with the complex $[SbCl_4]^+[SbF_6]^-$. The recondensed product of the reaction was found by analysis to be 1,1,1,2-tetrachloro-2-fluoroethane and 1,1,1-trichloro-2,2-difluoroethane.

Various modifications of the process of the present invention may be made without departing from the spirit or scope thereof, and it is to be understood that the invention is limited only as defined in the appended claims.

We claim:

1. A process for preparing 1,1,1,2-tetrachloro-2-fluoroethane or 1,1,1-trichloro-2,2-difluoroethane which comprises reacting a complex selected from the group consisting of the fluorochloroarsenic complex $$[AsCl_4]^+[AsF_6]^-$$

and the fluorochloroantimony complex, $[SbCl_4]^+[SbF_6]^-$, with bis(2,2,2-trichloro-1-hydroxyethyl)sulfide and recovering said 1,1,1,2-tetrachloro-2-fluoroethane or 1,1,1-trichloro-2,2-difluoroethane.

2. The process of claim 1 wherein said complex is the fluorochloroarsenic complex $[AsCl_4]^+[AsF_6]^-$.

3. The process of claim 1 wherein said reacting is done by heating at atmospheric pressure at a temperature of about 90° C. to about 260° C. and wherein the mole ratio of said complex to said bis(2,2,2-trichloro-1-hydroxyethyl)sulfide is at least 4:1.

4. The process of claim 2 wherein said reacting is done by heating at atmospheric pressure at a temperature of about 90° C. to about 260° C., and wherein the mole ratio of said complex to said bis(2,2,2-trichloro-1-hydroxyethyl)sulfide is at least 4:1.

References Cited

UNITED STATES PATENTS 3,287,424  11/1966  Pacini et al. _____ 260—653.8

DANIEL D. HORWITZ, *Primary Examiner.*